United States Patent
Shea

(10) Patent No.: US 7,344,783 B2
(45) Date of Patent: Mar. 18, 2008

(54) DURABLE HYDROPHOBIC SURFACE COATINGS USING SILICONE RESINS

(75) Inventor: Timothy Michael Shea, The Woodlands, TX (US)

(73) Assignee: Shell Oil Company, Houston, TX (US)

( * ) Notice: Subject to any disclaimer, the term of this patent is extended or adjusted under 35 U.S.C. 154(b) by 381 days.

(21) Appl. No.: 10/885,985

(22) Filed: Jul. 7, 2004

(65) Prior Publication Data
US 2005/0009953 A1  Jan. 13, 2005

Related U.S. Application Data

(60) Provisional application No. 60/485,698, filed on Jul. 9, 2003.

(51) Int. Cl.
*B32B 9/00* (2006.01)
*B32B 9/04* (2006.01)
*C09K 3/18* (2006.01)

(52) U.S. Cl. .................. 428/429; 428/428; 428/432; 428/447; 523/169

(58) Field of Classification Search ................ 523/169
See application file for complete search history.

(56) References Cited

U.S. PATENT DOCUMENTS

| | | | |
|---|---|---|---|
| 3,579,540 A | 5/1971 | Ohlhausen | 260/33.4 |
| 3,986,997 A | 10/1976 | Clark | 260/29.2 |
| 4,983,459 A | 1/1991 | Franz et al. | 428/410 |
| 4,997,684 A | 3/1991 | Franz et al. | 427/384 |
| 5,071,709 A | 12/1991 | Berquier et al. | 428/447 |
| 5,324,566 A | 6/1994 | Ogawa | 428/141 |
| 5,328,768 A | 7/1994 | Goodwin | 428/428 |
| 5,360,851 A | 11/1994 | Feder et al. | 524/157 |
| 5,425,804 A | 6/1995 | Shinohara | 106/2 |
| 5,449,712 A | 9/1995 | Gierke et al. | 524/266 |
| 5,523,161 A | 6/1996 | Goodwin | 428/421 |
| 5,523,162 A | 6/1996 | Franz et al. | 428/421 |
| 5,571,622 A | 11/1996 | Ogawa et al. | 428/391 |
| 5,800,918 A | 9/1998 | Chartier et al. | 428/336 |
| 5,840,800 A | 11/1998 | Joffre et al. | 524/806 |
| 5,889,086 A | 3/1999 | Ushijima | 523/169 |
| 5,997,943 A | 12/1999 | Azzopardi et al. | 427/167 |
| 6,001,485 A | 12/1999 | Kobayashi et al. | 428/428 |
| 6,025,025 A | 2/2000 | Bartrug et al. | 427/302 |
| 6,099,971 A | 8/2000 | Faris et al. | 428/447 |
| 6,340,502 B1 | 1/2002 | Azzopardi et al. | 427/387 |
| 2002/0082329 A1* | 6/2002 | Arora et al. | 524/430 |

FOREIGN PATENT DOCUMENTS

EP  1199343  4/2002

* cited by examiner

*Primary Examiner*—Randy Gulakowski
*Assistant Examiner*—John J. Figueroa

(57) ABSTRACT

A hydrophobic coating including solid silsesquioxane silicone resins to increase durability is provided. The hydrophobic coating is any composition that increases the contact angle to a surface, preferably glass. The durability of the hydrophobic coating is preferably increased to one and a half years, more preferably three years.

51 Claims, 1 Drawing Sheet

DURABLE HYDROPHOBIC SURFACE COATINGS USING SILICONE RESINS

This application claims the benefit of U.S. Provisional Application No. 60/485,698 filed Jul. 9, 2003, the entire disclosure of which is hereby incorporated by reference.

FIELD OF THE INVENTION

The invention relates to the art of surface treatment and more particularly to the art of producing a durable hydrophobic surface.

BACKGROUND OF THE INVENTION

Hydrophobic coatings for glass surfaces are known using traditional silane chemistry. When a glass surface is provided with a hydrophobic coating and the glass is used for a windshield or side window of an automobile, the driver's visual field is secured. Typically, an alkoxylated silane is allowed to react with the glass surface, thereby attaching the coating material to the substrate. Unfortunately, the inherent disadvantage to this approach is that the resulting silicone bond (Si—O—Si) is vulnerable to hydrolysis. Methods to minimize the hydrolysis include increasing the packing density of the material on the surface. This causes steric effects to aid in the prevention of water reaching the reaction site, thereby preventing hydrolysis. These hydrophobic coatings provide improved visibility when used on automobile window glass. However, these coatings have a tendency to wear off within a few months.

The problems of hydrophobic coatings also extend to the airline industry. The current coating technologies are inadequate because of their limited durability. Technologies for improving the visibility in aircraft under rainy conditions include "jet blast" and windshield wipers. Windshield wiper systems further include hydrophobic coatings for greater effectiveness. The "jet blast" system involves blanketing the surface of the windshield with a blanket of high velocity air. However, there is still a need for a more durable coating that will last for more than a year and significantly improve the pilot's visual field during inclement weather.

The above water-repellent glass is generally produced by a wet-coating method in which a water-repellent agent containing an organic silicon compound, typified by a polydimethylsiloxane compound or a fluorine-containing silicon compound, is wet-coated on a glass surface, or by a dry-coating method in which the above water-repellent agent is dry-coated by means of plasma or vapor deposition. However, in the above methods of coating the water-repellent agent directly on a glass surface, it is difficult to maintain water repellency for a long time, since the adhesion strength between the water-repellent agent and the glass is low.

The non-wettability of a substrate, more commonly referred to as its hydrophobic/oleophobic property, consists in the fact that the contact angles between a liquid and this substrate are high, for example at least about 60° for water. The liquid therefore tends to flow readily over the substrate, in the form of drops, simply under gravity if the substrate slopes, or under the effect of aerodynamic forces in the case of a moving vehicle. Examples of agents which are known to impart this hydrophobic/oleophobic property are fluorinated alkylsilanes as described in U.S. Pat. Nos. 5,571,622; 5,324,566; and 5,571,622 which are hereby incorporated by reference in their entirety. According to these patents, this layer is obtained by a solution containing fluorinated organosilanes in a non-aqueous organic solvent is applied to the surface of a substrate. Preferred non-aqueous organic solvents include n-hexadecane, toluene, xylene, etc. These solvents are particularly suitable for a fluorinated chlorosilane. It is also possible to use a methyl or ethyl alcohol as solvent when the fluorinated silane is a fluorinated alkoxysilane.

The hydrophobic coating includes hydrolyzable fluorinated alkylsilanes. They are preferably of the monomolecular type obtained from at least one fluorinated alkylsilane whose carbon chain, which may be branched, comprises at least six carbon atoms, with the carbon of the extremity (extremities) being entirely substituted by fluorine. The layer can also be obtained from fluorinated alkylsilanes or from a mixture of fluorinated alkylsilanes and, possibly, a mixture of fluorinated alkylsilanes and silanes of the $SiX_4$ type in which X is a hydrolyzable group. The current hydrophobic coatings also have environmental and safety issues. The coating may involve the application of perfluoro alkyl silanes in a halogenated hydrocarbon solvent. Current coatings also employ cationic quaternary ammonium compounds and silico-titanium copolymers.

For the foregoing reasons, there is a need for a more durable hydrophobic coating, preferably with a contact angle of at least about 90°, more preferably 100° capable of maintaining acceptable contact angles for at least about 1.5 years. This minimum is extended to about 3 years if the coating is not easily replaceable.

SUMMARY OF THE INVENTION

Embodiments of the invention fulfill the aforementioned need in one or more of the following aspects. In one aspect, the invention relates to a durable water repellent composition for surfaces which comprises a curing agent and a silicone resin. The silicone resin is preferably a silsesquioxane silicone resin. In some embodiments, the curing agent is a $C_{16}$-$C_{18}$ alkoxysilane and the silicone resin is an MQ resin.

In other aspects of the invention, the invention relates to an article comprising a glass substrate of which at least a portion of the substrate is treated with the durable water repellent composition discussed above. In some embodiments, the curing agent and the silicone resin is at least in part crosslinked. In some embodiments, the article may further include a primer layer, a topcoat layer, or both.

Additional aspects of the invention and characteristics and properties of various embodiments of the invention become apparent with the following description.

DESCRIPTION OF EMBODIMENTS OF THE INVENTION

Figure 1:
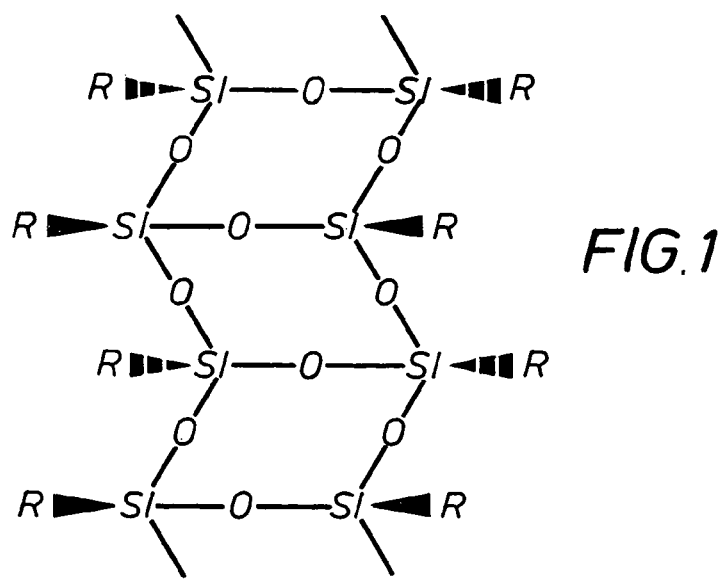
FIG. 1 is a schematic representation of a ladder type silsesquioxane.

In the following description, all numbers disclosed herein are approximate values, regardless whether the word "about" or "approximate" is used in connection therewith. They may vary by 1 percent, 2 percent, 5 percent, or sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide a hydrophobic coating having improved durability of rain and soil repellency on glass and/or glass-like surfaces through the addition of a solid silicone resin to the hydrophobic coating. The hydrophobic coating comprises a curing agent. Other embodiments include surface preparation, a primer layer, and crosslinking the hydrophobic coating. In some embodiments, the hydrophobic coating is not crosslinked.

Hydrophobic coatings comprise any composition which increases the water repellency of the surface it is applied to. Without being bound by any particular theory, the coating is obtained through reaction of a curing agent with reactive groups on the surface of the substrate, forming a covalent bond. Curing agents which increase the repellency include alkyl polysiloxanes, perfluoroalkyl silanes, fluorinated olefin telomers, organosilanes, and modified organic silicone oils. These components are described in U.S. Pat. Nos. 3,579,540; 4,983,459; 5,071,709; 5,328,768; 5,425,804; 5,800,918; 5,889,086; 5,997,943; and 6,340,502, all of which are herein incorporated by reference in their entirety. The overall structure of the layer is, for an organosilane, covalent bonding at the point of fixation on the surface of the substrate, and one or two covalent bonds with neighboring organosilane molecules, through other hydrolyzable moieties. The thickness of the layer obtained ranges from about 5 to about 1000 angstroms, preferably about 10 to about 100 angstroms. The layer preferably does not impair the transparency of, or vision through, the substrate.

Curing agents also include organic silicon compounds and/or organic fluorine compounds. The organic silicone compounds which may be used as a hydrophobic coating include low molecular weight polysiloxanes, chlorosilane compounds, alkoxysilane compounds, silazane compounds and agents composed mainly of these compounds. These compounds may be used in various combinations.

Examples of polysiloxanes include a linear, branched or cyclic polydimethylsiloxane; polysiloxanes having a hydroxyl group in the molecular chain such as silanol-terminated polydimethylsiloxane, silanol-terminated polydiphenylsiloxane, diphenylsilanol-terminated polydimethylphenylsiloxane, carbinol-terminated polydimethylsiloxane, hydroxypropyl-terminated polydimethylsiloxane and polydimethyl-hydroxyalkylene oxide methylsiloxane; polysiloxanes having an amino group in the molecular chain such as bis (aminopropyldimethyl)siloxane, aminopropyl-terminated polydimethylsiloxane, aminoalkyl group-containing, T-structured polydimethylsiloxane, dimethylamino-terminated polydimethylsiloxane and bis(aminopropyldimethyl)siloxane; polysiloxanes having a glycidoxyalkyl group in the molecular chain such as glycidoxypropyl-terminated polydimethylsiloxane, glycidoxypropyl-containing, T-structured polydimethylsiloxane, polyglycidoxypropylmethylsiloxane and a polyglycidoxypropylmethyldimethylsiloxane copolymer; polysiloxanes having a chlorine atom in the molecular chain such as chloromethyl-terminated polydimethylsiloxane, chloropropyl-terminated polydimethylsiloxane, polydimethyl-chloropropylmethylsiloxane, chloro-terminated polydimethylsiloxane and 1,3-bis (chloromethyl)tetramethyldisiloxane; polysiloxanes having a methacryloxyalkyl group in the molecular chain such as methacryloxypropyl-terminated polydimethylsiloxane, methacryloxypropyl-containing, T-structured polydimethylsiloxane and polydimethyl-methacryloxypropylmethylsiloxane; polysiloxanes having a mercaptoalkyl group in the molecular chain such as mercaptopropyl-terminated polydimethylsiloxane, polymercaptopropylmethylsiloxane and mercaptopropyl-containing, T-structured polydimethylsiloxane; polysiloxanes having an alkoxy group in the molecular chain such as ethoxy-terminated polydimethylsiloxane, polydimethylsiloxane having trimethoxysilyl on one terminal and a polydimethyloctyloxymethylsiloxane copolymer; polysiloxanes having a carboxyalkyl group in the molecular chain such as carboxylpropyl-terminated polydimethylsiloxane, carboxylpropyl-containing, T-structured polydimethylsiloxane and carboxylpropyl-terminated, T-structured polydimethylsiloxane; polysiloxanes having a vinyl group in the molecular chain such as vinyl-terminated polydimethylsiloxane, tetramethyldivinyldisiloxane, methylphenylvinyl-terminated polydimethylsiloxane, a vinyl-terminated polydimethylpolyphenylsiloxane copolymer, a vinyl-terminated polydimethyl-polydiphenylsiloxane copolymer, a polydimethyl-polymethylvinylsiloxane copolymer, methyldivinyl-terminated polydimethylsiloxane, a vinyl terminated polydimethylmethylvinylsiloxane copolymer, vinyl-containing, T-structured polydimethylsiloxane, vinyl-terminated polymethylphenetylsiloxane and cyclic vinylmethylsiloxane; polysiloxanes having a phenyl group in the molecular chain such as a polydimethyl-diphenylsiloxane copolymer, a polydimethyl-phenylmethylsiloxane copolymer, polymethylphenylsiloxane, a polymethylphenyl-diphenylsiloxane copolymer, a polydimethylsiloxane-trimethylsiloxane copolymer, a polydimethyl-tetrachlorophenylsiloxane copolymer and tetraphenyldimethylsiloxane; polysiloxanes having a cyanoalkyl group in the molecular chain such as polybis (cyanopropyl)siloxane, polycyanopropylmethylsiloxane, a polycyanopropyl-dimethylsiloxane copolymer and a polycyanopropylmethyl-methyphenylsiloxane copolymer; polysiloxanes having a long-chain alkyl group in the molecular chain such as polymethylethylsiloxane, polymethyloctylsiloxane, polymethyloctadecylsiloxane, a polymethyldecyl-diphenylsiloxane copolymer and a polymethylphenetylsiloxane-methylhexylsiloxane copolymer; polysiloxanes having a fluoroalkyl group in the molecular chain such as polymethyl-3,3,3-trifluoropropylsiloxane and polymethyl-1,1,2,2-tetrahydrofluorooctylsiloxane; polysiloxanes having a hydrogen atom in the molecular chain such as hydrogen-terminated polydimethylsiloxane, polymethylhydrosiloxane and tetramethyldisiloxane; hexamethyldisiloxane; and a polydimethylsiloxane-alkylene oxide copolymer. Many polysiloxanes are commercially available as water repellents, such as Super Rain X formed mainly of polydimethylsiloxane (supplied by Unelko) and Glass Clad 6C formed mainly of polydimethylsiloxane whose terminal groups are replaced with chlorine atom (supplied by Petrarch Systems Inc.). For adhesion to a porous silica layer, it is advantageous to use polysiloxanes having functional groups which easily physically or chemically bond to a hydroxyl group on the silica surface, such as alkoxy, hydroxyl and amino groups. The above polysiloxanes may be used alone or in combination.

Chlorosilane compounds and alkoxysilane compounds have the following formula:

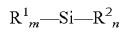

wherein $R^1$ is an alkyl group having 1 to 20 carbon atoms, a fluoroalkyl group or an alkyl or a group containing fluoroalkyl in combination with a —O—, $CO_2$—, $SO_2N$ ($C_3H_7$) or —CONH—, $R^2$ is chlorine or an alkoxy group having 1 to 6 carbon atoms, m is 1, 2 or 3, and n is 1, 2 or 3, provided that m+n=4. Typical examples of the chlorosilane compound and alkoxysilane compound include $C_{18}$ $H_{37}$ $SiCl_3$, $C_{18}$ $H_{37}$ $Si(OCH_3)_3$, $C_{12}$ $H_{25}$ $SiCl_3$, $C_{12}$ $H_{25}$ $Si(OCH_3)_3$, $CF_3$ $(CF_2)_7$ $CH_2$ $CH_2$ $Si(OCH_3)_3$, $CF_3$ $(CF_2)_7$ $CH_2$ $CH_2$ $SiCl_3$, $CF_3$ $(CF_2)_5$ $CH_2$ $CH_2$ $SiCl_3$, $CF_3$ $(CF_2)_5$ $CH_2$ $CH_2$ $Si(OCH_3)_3$, $CF_3$ $CH_2$ $CH_2$ $SiCl_3$, $CF_3$ $CH_2$ $CH_2$ $Si(OCH_3)_3$, $C_8$ $F_{17}$ $SO_2$ $N(C_3$ $H_7)CH_2$ $CH_2$ $CH_2$ $Si(OCH_3)_3$, $C_7$ $F_{15}$ $CONHCH_2$ $CH_2$ $CH_2$ $Si($ $)CH_3)_3$, $C_{88}$ $F_{17}$ $CO_2$ $CH_2$ $CH_2$ $CH_2$ $Si(OC$ $H_3)_3$, $C_8$ $F_{17}$—O—$CF(CF_3)CF_2$—O—$C_3H_6$ $SiCl_3$ and $C_3F_7$—O—$CF(CF_3)CF_2$—O)$_2$—$CF(CF_3)$ CONH—$CH_2)_3$ $Si(OCH_3)_3$. These compounds may be used as a mixture, or may be preliminarily converted to partial hydrolysis condensates with an acid or an alkali before use. In a preferred embodiment, the alkoxysilane comprises from 16 to 18 carbon atoms.

Typical examples of the silazane compound include hexamethyldisilazane and $CF_3$ $(CF_2)_7$ $CH_2$ $CH_2$ $Si(NH)_{3/2}$. These may be used as a mixture, or may be preliminarily converted to partial hydrolysis condensates with an acid or an alkali before use.

The fluorinated alkylsilane is preferably a perfluoroalkylsilane with the general formula:

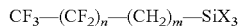

in which: n is 0 to 12; m is 2 to 5; X is a hydrolyzable group, for example, a chlorinated group or alkoxy group. Preferably, the perfluoroalkylsilane is selected from the group: $CF_3$—$(CF_2)_5$—$(CH_2)_2$—$SiCl_3$, $CF_3$—$(CF_2)_7$—$(CH_2)_2$—$SiCl_3$, $CF_3$—$(CF_2)_9$—$(CH_2)_2$—$SiCl_3$.

To increase the durability of the coatings, solid silicone resins having a low molecular weight have been added to various curing agents such as described above. The silicone resins are solid at ambient temperatures, preferably in a powder form. The molecular weight of the resins is preferably from about 5,000 to about 15,000, more preferably from about 8,000 to about 10,000. The amount of silicone resins in the hydrophobic composition ranges from about 0.25 to about 4 wt %, preferably from about 0.5 to about 2 wt %, more preferably from about 0.75 to about 1.5 wt %. The silicone resins are preferably silsesquioxane silicone resin (polysilsesquioxanes).

Figure 2:
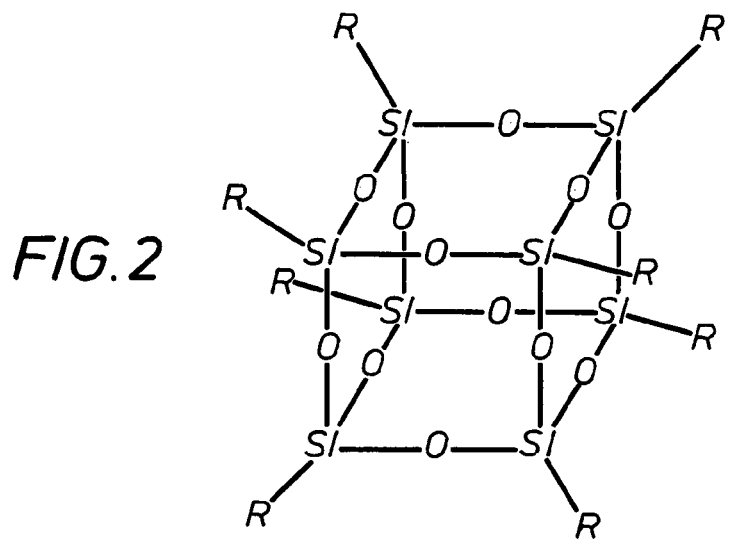
FIG. 2 is a schematic representation of a $T_8$ cube type silsesquioxane.
Figure 3:
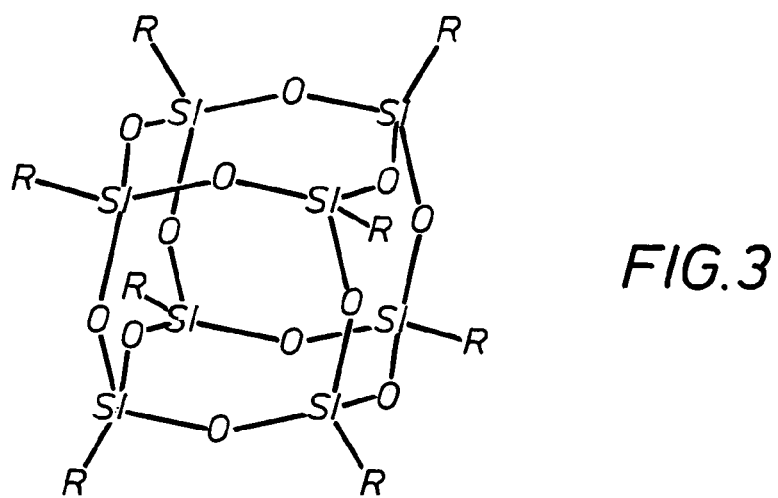
FIG. 3 is a schematic representation of a cage type silsesquioxane.

Silsesquioxane silicone resin, or T-resins, are a class of compounds with the empirical formula $RSiO_{1.5}$. These compounds derive their name from the one and one half (1.5) stoichiometry of oxygen bound to silicon, with the alternate name "T-resin" derived from the presence of three oxygen substituents on silicon (tri-substituted). Several structural representations of silsesquioxanes with the empirical formula $RSiO_{1.5}$ are possible, with the two most common representations being a ladder-type structure, see FIG. 1, and a cubic structure, see FIG. 2 containing eight silicon atoms placed at the vertices of the cube. The ladder-type structure is a two dimensional oligomeric silicon-oxygen structure. The cubic structure has discrete molecular clusters of silicon and oxygen having capping terminations on the open coordination sites of the silicon atom. The cubic structure is more accurately represented by a cage structure, see FIG. 3. Some cubic cases comprise a square prismatic arrangement of silicon atoms linked through oxygen atoms. Other sites are terminated by any suitable capping ligand group, such as an alkyl or alkoxy group. The silicone resin may have a ladder-type structure, a T8 cube structure, or a cage structure. In a preferred embodiment, the resin is a T-resin having a three dimensional structure. In a more preferred embodiment, the resin is a product of the cohydrolysis of tetraalkoxysilane and trimethylethoxysilane, commonly known as an MQ resin. The chemcial structure of the MQ resin is a three dimensional network of polysilicic units terminated with trimethylsilyl groups.

In a preferred embodiment, the durable water repellant coating employed in the present invention are the products of the hydrolysis and condensation of at least one alkyltrialkoxysilane having the structure

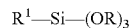

wherein R is an alkyl group containing 1 to about 4 carbon atoms, and $R^1$ is an aliphatic, cycloaliphatic, or aromatic group containing 1 to about 12 carbon atoms. Groups represented by $R^1$ can include substituent or connective moieties such as ethers, amides, esters, arylene, and the like. Preferably, however, $R^1$ is selected from the group consisting of alkyl or fluoroalkyl containing 1 to about 12 carbon atoms, cycloalkyl containing 5 to about 12 carbon atoms, and aryl containing 6 to about 12 carbon atoms. More preferable $R^1$ groups are alkyl groups containing 1 to about 3 carbon atoms, methyl being particularly preferred.

Polysilsesquioxanes, which are generally prepared by the hydrolysis and condensation of methyltrimethoxysilane (Scheme 1, R=—$CH_3$), are commercially available from various sources including Wacker-Chemie GmbH (Munich, Germany).

Substituents on silicon can include hydrogen, alkyl, alkenyl, alkoxy and aryl. Due to organic substitution on silicon, many silsesquioxanes have reasonable solubility in common organic solvents.

The silicone resin is preferably an alkyl poly-silsesquioxane, a poly-siloxane modified with a cyanoalkyl or carbinol group and, a poly-silicate. These materials are very soluble in aqueous liquids. The polysiloxane contains covalently bonded reactive functionalities suitable for polymerization or grafting silsesquioxanes to polymer chains. The polysiloxane contains nonreactive organic functionalities for solubility and compatibility of the polysiloxane with various polymer systems. In some embodiments, the polysiloxane does not incorporate an oxide.

In the present invention, the above silicone compound and/or the above organic fluorine compound may be used with a solvent, an adhesion promoter, a curing agent and a curing catalyst as required. In some embodiments, the coating composition is substantially free of colloidal silica. In some embodiments, the coating composition is substantially free of polybutylene. In some embodiments, the coating composition is substantially free of alkyd resin.

The solvent is one that can dissolve the above silicone compound and/or the above organic fluorine compound and can be uniformly applied to a substrate. The solvent is generally selected from fluorine-containing solvents, aliphatic or aromatic solvents, ketones and esters.

The adhesion promoter for improving the adhesion of the porous silica surface to the above silicone compound and/or the above organic fluorine compound is not always required. The adhesion promoter can therefore be selected depending upon use. Typical examples of the adhesion promoter include silane coupling agents such as γ-glycidoxypropyltrimethoxysilane, 2-(3,4-epoxycyclohexyl)ethyltrimethoxysilane, tetramethoxysilane and γ-aminopropyltrimethoxysilane.

A solution based on a fluorinated alkylsilane or a mixture of fluorinated alkylsilanes and, optionally, other silanes in a nonpolar solvent system may be used as the hydrophobic coating. The solution comprises an alkylsilane of the type described above, whose concentration varies from about $2\times10^{-3}$ to about $5\times10^{-2}$ mol/L in a nonpolar solvent system. The choice of solvent is not indifferent and has an influence on the proportion of alkylsilanes grafted onto the substrate. The solvent system consists of at least about 80 vol % of a nonpolar solvent and about 20% of a chlorinated solvent(s). The nonpolar solvent comprises, preferably, a carbon chain whose length is on the same order of magnitude as that of the organosilane used. In other words, the number of carbons of the solvent is overall identical, to the nearest two or three carbons, to the number of carbons present in the carbon chain of the organosilane. The nonpolar solvent is, preferably, selected from n-hexadecane or isooctane, the chlorinated solvent is preferably selected from the group comprising dichloromethane, trichloromethane, trichloroethane, trichloroethylene, trichlorotrifluoroethane, and carbon tetrachloride.

The organic fluorine compounds used are largely classified into compounds having a low molecular weight or a polymer or oligomer compound. Suitable compounds having low molecular weight include fluoroalkyl alcohols, fluoroalkylcarboxylic acids and fluoroalkylamines in addition to the above organic fluorine-containing silicone compounds. Suitable polymers and oligomers include polytetrafluoroethylene, polytrifluoroethylene, polyvinyl fluoride, polyvinylidene fluoride, polyperfluoroalkyl vinyl ether, polyperfluoropropylene, a polytetrafluoroethylene-perfluoropropylene copolymer, a polytetrafluoroethylene-ethylene copolymer and a polyvinyl fluoride-ethylene copolymer. Further, the suitable polymers and oligomer compound also include compounds prepared by introducing a functional group such as hydroxyl, amino, epoxy or carboxyl into any one of the above organic fluorine compounds, and fluorine polyethers or fluorine-containing poly(meth)acrylates. Typical examples of the polyethers include perfluoroethylene oxide, perfluoropropylene oxide, a perfluoromethylene oxide-perfluoropropylene oxide copolymer, a perfluoromethylene oxide-perfluoroethylene oxide copolymer, a perfluoroethylene oxide-perfluoropropylene oxide copolymer and a compound prepared by introducing carboxyl, hydroxylalkyl, ester or isocyanate into the terminus or molecular chain of any one of the above fluorine-containing polyethers. Typical examples of the (meth)acrylates include polytrifluoroethyl (meth)acrylate, polytetrafluoropropyl (meth)acrylate, polyoctafluoropentyl (meth)acrylate, polyheptadecafluorodecyl (meth)acrylate, a copolymer of fluorine-containing (meth)acrylates, and a copolymer of fluorine-containing (meth)acrylate and other (meth)acrylate such as methyl (meth)acrylate, hydroxyethyl (meth)acrylate or glycidyl (meth)acrylate. These may be used in combination. A hydrophobic coating layer formed of the above silicone compound containing fluorine has remarkably low surface tension and shows excellent water repellency.

The hydrophobic/oleophobic agents are applied in known fashion in solution using conventional deposition methods, with or without heating. Other hydrophobic agents which may be used include those disclosed in U.S. Pat. Nos. 6,025,025; 5,523,162; 5,328,768; 4,997,684; and 4,983,459, all of which are hereby incorporated by reference in their entirety. If heated, the temperature ranges from about 50° C. to about 250° C., more preferably from about 80° C. to about 120° C. The duration of heating ranges from about 5 min to about 120 min, more preferably from about 10 min to about 30 min.

The hydrophobic coating may further contain waxes, lower alcohols, polishing agents, surfactants, solvents, catalysts, beading agents, preservatives, anti-foaming agents, UV absorber/UV light stabilizer or a freeze-thaw additive etc. as desired. Examples of the usable waxes are vegetable waxes such as carnauba wax, Japan waxes, ouricury wax, esbal wax; animal waxes such as insect waxes, shellac wax, spermacetic wax; petroleum waxes such as paraffin wax, microcrystalline wax, polyethylene wax, ester wax, oxide wax; as well as mineral waxes such as montan wax, ozokerite, celesine, etc. In addition to these waxes, higher aliphatic acid such as palmitic acid, stearic acid, margaric acid, behenic acid; higher alcohols such as palmityl alcohol, stearyl alcohol, behenyl alcohol, margaryl alcohol, myricyl alcohol, eicosanol, etc.; higher aliphatic acid esters such as cetyl palmitate, myricyl palmitate, cetyl stearate, myricyl stearate, etc.; higher amides such as acetamide, propionamide, palmitic acid amide, stearic acid amide, amide wax, etc. and higher amines such as stearylamine, behenylamine. These can be used singly or as a combination of two or more thereof.

Of these, waxes having a melting point of about 50 to about 130° C. when measured using a Yanagimoto MJP-2 melting point tester are most preferred. The waxes should have a particle size of generally about 0.1 to about 10 μm, preferably about 0.5 to about 2.0 μm when dispersed in the composition. For non-visual applications, the content of the waxes should be generally from about 2 to about 20 wt %, preferably about 5 to about 15 wt %. For visual applications, the content of the waxes should be generally from about 0.1 to about 10 wt %, preferably about 0.5 to about 2 wt %.

Examples of the above described alcohols are monohydric alcohols such as methyl alcohol, ethyl alcohol, n-propyl alcohol, iso-propyl alcohol, n-butyl alcohol, iso-butyl alcohol, sec-butyl alcohol, tert-butyl alcohol, allyl alcohol, crotyl alcohol, 2-butenol, etc.; dihydric alcohols such as ethylene glycol, propylene glycol, etc.; glycol ethers such as ethylene glycol monomethyl ether, ethylene glycol monobutyl ether, ethylene glycol dimethyl ether, etc. These alcohols can be used singly or as a combination or two or more. The alcohols are used in an amount of usually about 70 to about 99 wt %, preferably about 90 to about 98 wt %.

Of the surfactants, any of anionic, cationic, nonionic and amphoteric surfactants can be used and there is no restriction as long as they do not impair the durability or hydrophobicity of the composition.

Examples of the usable anionic surfactants are higher aliphatic acid salts such as aliphatic acid salt, rosin acid soap, N-acylcaboxylic acid salts, ethercarboxylic acid salt, etc.; sulfonic acid salts such as alkylsufonic acid salts, sulfosuccinic acid salts, esterified sulfonic acid salt, alkylbenzensulfonic acid salts, alkylallylsulfonic acid salt, alkylnaphthalenesulfonic acid salts, N-acylsulfonic acid salts; sulfuric acid ester salts such as sulfated oil, sulfuric acid ester salts such as alkyl sulfate salts, alkylallylether sulfate salts, aminosulfuric acid salts, etc.; phosphoric acid ester salts such as alkylphosphate salts, etherphosphoric acid salts, alkyletherphosphoric acid salts, alkylallyletherphosphoric acid satas, amidophosphate salts, etc. and formaldehyde-condensed sulfonic acid salts.

Of these, preferred are alkanol amines and amine salts alkylbenzensulfonic acid, alkanolamines and amine salts of alkylsulfonic acid, metal salts of alkylphophoric acid and metal salts of higher aliphatic acid.

Examples of the usable cationic surfactants are aliphatic amine salts such as primary amine salts, secondary amine salts, tertiary amine salts; quaternary ammonium salts, hidroxyammonium salt, ether ammonium salts and quaterary ammonium salts thereof, etc.; and aromatic quaternary ammonium salts such as benzalconium salt, benzetonium salt, pyridinium salt, imidazolinium salt, etc.

Of these, tertiary amine salts such as diethylamide of stearic acid; quaternary ammonium salts such as stearyltolylmethylammonium chloride; and benzalconium salts such as stearyldimethylbenzylammonium chloride, etc. Examples of the amphoteric surfactants, betaines such as carboxybetaines, sulfobetaines, etc., aminocarboxylic acids, imidazoline derivatives. Of these, imidazoline derivatives are preferred.

Examples of the usable nonionic surfactants are polyoxyethylene alkylethers, polyoxyethylene alkylphenylethers, polyoxyethylene alkyl esters, sorbitane alkylesters, polyoxyethylene sorbitane ester. etc.

Of these, preferred are polyoxyethylenealkylethers, polyoxyethylene-alkylphenylethers and polyoxyethylene alkyl esters. When those having a low HLB value of about 5 to about 10 is used, W/O (water in oil) type emulsions are formed, which have good water-repellency. When those having a high HLB value of not less than about 12 are used, O/W water in oil type emulsions are formed, which have good detergency and wipe-off property although they are rather poor in water repellency.

These surfactants can be used singly or as a combination of two or more thereof. The content of these surfactants in the hydrophobic coating is generally no more than about 5.0 wt %, preferably about 0.005 to about 2 wt %.

Further, as the above-mentioned polishing agents, diatomaceous earth (kieselguhr), alumina, silica, zirconium oxide, etc. can be used. These polishing agents generally have a particle size of not more than about 10 μm, preferably about 1 to about 5 μm. For non-visual applications, the content of the polishing agent is generally about 1 to about 20 wt %, preferably about 5 to about 10 wt %. For visual applications, the content of the polishing agent is generally about 0.1 to about 10 wt %, preferably about 0.5 to about 2 wt %.

Various processes are available for coating the surface of a glass panel with a solution to produce a hydrophobic film thereon. They include a dipping process for immersing a glass panel in a coating solution, a spraying process for spraying a coating solution from a spray gun onto a glass panel, a spin-coating process for dropping a coating solution onto a glass panel while the glass panel is being rotated at high speed, thereby to spread the applied coating solution uniformly over the glass panel under centrifugal forces, and a flow process for flowing a coating solution from a nozzle onto an upper edge of a glass panel.

A sponge, a cloth, or a piece of paper impregnated with the hydrophobic coating obtained as described above is used to apply the hydrophobic coating to the surface of glass requiring water repellency. The applied layer of the water repellent is left to dry. When the hydrophobic coating dries, a thin white film is formed on the glass surface. The treatment is completed by wiping this white film with a damp cloth or sponge until the glass becomes transparent.

Instead of applying the hydrophobic coating with a sponge or the like, the hydrophobic coating may be applied to the glass surface by spraying and then spread with a sponge or a cloth.

The glass to be coated is glass comprising mineral and/or organic glass. It is used, in particular, in the aeronautical, railroad or automobile areas. It also can be used in construction or in interiors, for example, as decorative panels, for furnishings, etc. The substrate on which the coating is capable of being applied moreover may be made up of any material comprising surface hydroxylated groups, such as glass products coated or not coated with mineral and/or inorganic, ceramic, vitroceramic layers (for example, heating plates), vitrified products, concrete or flagstones. The substrate may be glass, silicon, alumina, or any surface having a high oxygen content. High oxygen content is defined as having an oxygen content of from about 40% to about 80%. The coating is applicable in areas as different as those of glazing, electric domestic appliances, building (windows), cooking utensils, sanitary fixtures (washbasin, bathtub), construction materials, etc.

The composition also may be deposited on a layer which is at least partially degraded. This degradation may be due, for example, to natural aging or to a mechanical or chemical abrasion. Abrasion may be due to the rubbing of windshield wipers or to the impact of rain, hail, or shock. As the surface on a degraded layer is as effective as the initial surface, it is not necessary to prepare the surface, such as with abrasion, or polishing, prior to deposition of the composition.

Nonetheless, the durability of the layer, preferably, may be improved by a preliminary treatment of the substrate with a priming compound of the type $SiX_4$, where X is a hydrolyzable group, for example chloride or alkoxy. X may be other halides, such as bromine. The alkoxy may have about 1 to about 100 carbon atoms. Priming increases the reactivity of the glass, which results in an improvement in attachment of the fluorous silane. In addition, the priming disorganizes the fluorous layer and thus makes it possible to form it with a greater thickness, at least equal to 100 angstroms, without, however, exceeding about 500 angstroms: it does not refer to a monomolecular layer. The increase thus obtained in the amount of fluorine deposited results in an increased durability under conditions of exposure to ultraviolet radiation. Moreover, at the above-mentioned thickness values for the fluorous layer, a scratch in the layer is not visible to the naked eye.

The priming treatment may be accomplished by using the same deposition process as that used for the deposition of the hydrophobic and oleophobic layer, and by using the same aqueous solvent and catalyst system. The priming compound may contain from about 0.001 to about 5% by weight of $SiX_4$. The treatment with the priming compound has the effect of increasing the number of reactive sites (hydroxylated sites) on the surface of the substrates.

Other primer layers that may be used to increase the durability of the hydrophobic coating may be found in U.S. Pat. Nos. 6,025,025; 6,001,485; 5,328,768; and 5,523,161 which are hereby incorporated by reference in their entirety.

When an organic silicone compound or organic fluorine compound having a hydroxyl group in the molecule is used, a curing agent such as polyisocyanate may be added to improve the moisture resistance and water resistance of the film. The curing agent is not always required, and may be selected depending upon use to increase the film stability by promoting the curing of an organic silicone compound and/or organic fluorine compound having a functional group. Further, as a catalyst for promoting the hydrolysis and condensation of the alkoxy group, mainly used are acid catalysts such as hydrochloric acid, sulfuric acid, nitric acid and glacial acetic acid, alkali catalysts such as sodium hydroxide, potassium hydroxide and ammonia, ammonium perchlorate, magnesium perchlorate, and aluminum acetylacetonate. As a catalyst for a reaction between the isocyanate and hydroxyl, generally used are tin-containing catalysts such as dibutyltin dilaurate and amine-containing catalysts. For bonding the mercapto and vinyl, generally used is a platinum catalyst. For the heat polymerization of the (meth)acryloxy, a large number of catalysts including azo- and peroxide-containing catalysts are commercially available, and for the polymerization thereof by ultraviolet light or electron beam, a large number of catalysts including acetophenone- and benzophenone-containing catalysts are commercially available. For the polymerization of the vinyl, there is used a known method using an anionic or cationic catalyst.

Alternative pre-treatment means effective for the surface of substrates such as glass, metals, ceramics and plastics, silica ($SiO_2$), is for example deposited or polyhalogenated silane such as dichlorosilane, trichlorosilane and tetrachlorosilane is coated and reacted with water. The pre-treatment can be with or without washing with a non-aqueous solution and increases the formation of silanol (—SiOH) groups on the substrate surface. By so doing, the chemical adsorbing material can be reacted in a high concentration.

The durability of the hydrophobic composition is also improved by modifying the surface of the substrate to provide an increased number of bonding sites on the surface of the substrate. These sites react with the hydrophobic coating to more effectively bond it to the substrate, thereby improving the durability of the hydrophobic coating. Exposing the bonding sites is sometimes referred to as activation. In a preferred embodiment of the invention, the bonding sites are exposed by treating the surface of the substrate, prior to applying the hydrophobic coating over the surface of the substrate, with a dispersion including at least one abrading compound and at least one acid in solution. The abrading compound/acid solution dispersion loosens and dislodges materials, such as surface contaminants and other glass constituents, which block the bonding sites, without materially affecting the mechanical or optical properties of the surface of the substrate. A synergistic effect has been observed where the abrading compound is dispersed in the acid solution. More particularly, a hydrophobic coating applied to a substrate surface prepared with the abrading compound/acid solution dispersion generally exhibits improved durability as compared to preparing the substrate surface with an abrading operation alone or an acid washing operation alone, and at least as good or better than an abrading operation followed a separate acid washing operation. It is believed that the high durability is obtained from the abrading compound/acid solution dispersion because the acid solution primarily chemically weakens chemical bonds between the materials blocking the bonding sites and the substrate, rendering such materials more easily removed from the surface of the substrate, while the abrading compound(s) operate with the acid solution to physically loosen and dislodge the materials which block the bonding sites. Additionally, either the acid solution, the abrading compound or both may operate to roughen the surface of the substrate, thereby providing more surface area, and in turn more bonding sites, for reaction with the hydrophobic coating to improve the durability of the hydrophobic coating. Further, use of the abrading compound/acid solution dispersion as disclosed reduces the cost and time to prepare the surface of the substrate over a two-step operation of abrading followed by acid activation.

Other surface preparation methods include those disclosed in U.S. Pat. No. 5,980,990 which is hereby incorporated by reference in its entirety.

In some embodiments, a method of making a hydrophobic surface comprises applying a water repellant composition to the surface of a substrate, wherein the water repellant composition comprises a curing agent and a silsesquioxane silicone resin. In some embodiments, the water repellant composition further comprises a solvent.

The contact angles recited herein are measured by an instrument manufactured by AST and is video based. A high magnification camera captures an image of the drop on the surface and software then calculates the resulting contact angle using the profile the drop makes with the surface.

Table 1 in the following indicates various compositions of hydrophobic coatings in accordance with embodiments of the invention.

TABLE 1

| Component | Preferred Range (wt. %) | More Preferred Range (wt. %) | Most Preferred Range (wt. %) |
|---|---|---|---|
| Silicone Resin | 0.1 to 5 | 0.25 to 2.0 | 0.75 to 1.25 |
| Solvent | 74.9 to 99.78 | 89.9 to 99.45 | 95 to 99 |
| Catalyst | 0 to 0.1 | 0 to 0.1 | 0.01 to 0.05 |
| Curing Agent | 0.025 to 10 | 0.05 to 4 | 0.1 to 2 |
| Additives | 0.1 to 10 | 0.25 to 4 | 0.5 to 2 |

The following examples are presented to illustrate various embodiments of the invention. All numerical values are approximate numbers. The specific details in each example should not be construed to limit the invention as otherwise described and claimed herein. The following tables show various hydrophobic compositions made in accordance with embodiments of the invention. The amount of each component added to each tinting composition is provided in weight percent of the total composition.

Formulations were prepared and applied to a standard 4"×4" plate glass. The formulations, in grams, are listed in Table 2. Additional formulations included: Composition A—Octadecyltrimethoxysilane (ODS) (1%) in cyclohexane available from Gelest, Inc.; and Composition B—Rain-X, a commercial hydrophobic glass treatment available from Pennzoil-Quaker State, Houston, Tex. The resin is an MQ silicone resin, such as those available from Wacker-Chemie, Munich, Germany. The reactive amino silicone may be grade F756 available from Wacker-Chemie. The isooctane is available from Aldrich Chemical. The tri-ethoxysilane is available from Gelest, Inc. The zirconium (IV) propoxide is available from Aldrich Chemical. The tetra-ethylorthosilicate is available from Aldrich Chemical. The 3-aminopropyltrimethoxysilane is available from Aldrich Chemical. The poly(methylsilsesquioxane) is available from Gelest, Inc. The silicone wax may be grade W23 brand available from Wacker-Chemie. The cyclohexane is available from Aldrich Chemical. The ODS topcoat is approximately 1-5 nm thick, using from about 1 to about 10 mL of solution to achieve this.

The formulations were applied to the glass substrate and subjected to a standard Taber Abraser with CS-0 wheels. The wheels were dressed using 220 grit sandpaper to make them slightly more abrasive. The wheels are wiped down with isopropanol prior to running a sample to remove any excess debris. Contact angles are measured using the ASTM D-5275-99 method and an apparatus available from AST such as the VCA Optima with a drop size of approximately 0.5 μL. The general method is placing a drop of water on the surface and taking a snapshot of the picture from the computer screen. The software then calculates the contact angle in the snapshot. Measurements are taken every 200 cycles to evaluate the coating performance and are shown in Table 3.

TABLE 2

| Composition | Resin | Reactive amino silicone | Isooctane | Triethoxy-silane | Zirconium (IV) Propoxide | Tetra-Ethylortho-silicate | 3-Amino Propyltrimethoxy-silane | Poly (methyl-silsesquioxane) | Silicone wax | Cyclohexane | ODS Top coat |
|---|---|---|---|---|---|---|---|---|---|---|---|
| C | 0.1 | 0.05 | 5 | 0.05 | | | | | | | |
| D | 0.1 | 0.05 | 5 | | 0.025 | 0.025 | 0.025 | | | | |
| E | 0.1 | 0.05 | 5 | | 0.025 | .025 | | | | | |
| F | 0.1 | 0.05 | 5 | | | | | 0.05 | | | |
| G | 0.1 | 0.1 | | | | | | | 0.1 | 9.7 | |
| H | 0.1 | 0.05 | 5 | | 0.025 | 0.025 | 0.025 | | | | yes |
| I | 0.1 | 0.05 | 5 | 0.05 | | | | | | | yes |
| J | 0.1 | 0.05 | 5 | | | | | 0.05 | | | yes |
| K | 0.1 | 0.05 | 5 | | 0.025 | 0.025 | 0.025 | | 0.01 | | yes |
| L | 0.1 | 0.05 | 5 | 0.05 | | | | | 0.01 | | yes |
| M | 0.1 | 0.05 | 5 | | | | | 0.05 | 0.01 | | yes |

TABLE 3

| Contact time | A | B | C | C (oven) | D | E | F (oven) | G | G + C | G + D | H | I | J | K | L | M |
|---|---|---|---|---|---|---|---|---|---|---|---|---|---|---|---|---|
| 0 | 101.325 | 105.1 | 112.75 | 126.7 | 123.7 | 123.7 | 113.55 | 104.85 | 106.5 | 92.45 | 104.2 | 103 | 105.7 | 101.6 | 99.3 | 104.1 |
| 200 | 91.85 | 101.3 | 84.45 | 58.75 | 67.8 | 81.95 | 58.65 | 87.15 | 93.65 | 84.6 | 95.5 | 95.4 | 96.8 | 67.9 | 93.4 | 92.8 |
| 400 | 82.85 | 71.1 | 72.65 | | | 72.75 | | 63.7 | 70.85 | 73.3 | 94.3 | 97.2 | 97.2 | | 69.9 | 65.5 |
| 600 | 62.65 | 63.35 | 66.3 | | | 64.45 | | | 67.4 | 63 | 85 | 87 | 84.4 | | | |
| 800 | | | | | | | | | | | 64.8 | 68 | 62.2 | | | |

The addition of silicone resin improves the durability of the hydrophobic coating. The resin increases the contact angle of the solution and also maintains a high contact angle for longer periods of time.

While the invention has been described with respect to a limited number of embodiments, the specific features of one embodiment should not be attributed to other embodiments of the invention. No single embodiment is representative of all aspects of the inventions. In some embodiments, the compositions may include numerous compounds and/or characteristics not mentioned herein. In other embodiments, the compositions do not include, or are substantially free of, one or more compounds and/or characteristics not enumerated herein. Variations and modifications from the described embodiments exist. For example, the hydrophobic coating need not be a mixture within the compositions given above. It can comprise any amount of components, so long as the properties desired in the hydrophobic coating are met. It should be noted that the application of the hydrophobic coating is not limited to coatings for automobiles; it can be used in any environment which requires a durable hydrophobic coating, such as a airplanes, trucks, vans or buses. It is noted that the methods for making and using the hydrophobic coating composition are described with reference to a number of steps. These steps can be practiced in any sequence. One or more steps may be omitted or combined but still achieve substantially the same results. The appended claims intend to cover all such variations and modifications as falling within the scope of the invention.

What is claimed is:

1. A durable water repellent composition for surfaces comprising: a curing agent, zirconium propoxide, a poly-silicate, and an MQ silicone resin, wherein the curing agent and the silicone resin are at least in part crosslinked, and wherein the curing agent comprises a poly-siloxane modified with a cyanoalkyl or carbinol group.

2. The composition of claim 1 wherein the composition includes tetra-ethylorthosilicate.

3. The composition of claim 1 wherein the composition includes 3-amino-propyltrimethoxysilane.

4. The composition of claim 1 wherein the amount of silicone resin in the range of from about 0.1 to about 5 wt. %.

5. The composition of claim 1 wherein the curing agent is a $C_{16}$-$C_{18}$ alkoxysilane.

6. The composition of claim 1 wherein the silicone resin has a cubic structure.

7. The composition of claim 1 wherein the silicone resin further includes an MQ resin.

8. The composition of claim 1 wherein the silicone resin has a molecular weight in the range of about 5,000 to about 15,000.

9. The composition of claim 1 further comprising a solvent.

10. The composition of claim 1 further comprising a catalyst.

11. The composition of claim 1 further comprising one or more additives.

12. The composition of claim 1 further comprising a solvent, a catalyst and one or more additives.

13. An article comprising a glass substrate of which at least a portion of the substrate is treated with a durable water repellant composition comprising: a curing agent;, zirconium propoxide, a poly-silicate, and an MQ silicone resin, and a silsesquioxane silicone resin; wherein said curing agent and silicone resin are at least in part crosslinked; and wherein the curing agent comprises a poly-siloxane modified with a cyanoalkyl or carbinol group.

14. The article of claim 13 further comprising a primer layer.

15. The article of claim 13 further comprising a topcoat layer.

16. An article comprising a glass substrate of which at least a portion of the substrate is treated with the composition of claim 2.

17. The article of claim 16 further comprising a primer layer.

18. The article of claim 16 further comprising a topcoat layer.

19. An article comprising a glass substrate of which at least a portion of the substrate is treated with the composition of claim 3.

20. The article of claim 19 further comprising a primer layer.

21. The article of claim 19 further comprising a topcoat layer.

22. An article comprising a glass substrate of which at least a portion of the substrate is treated with the composition of claim 4.

23. The article of claim 22 further comprising a primer layer.

24. The article of claim 22 further comprising a topcoat layer.

25. An article comprising a glass substrate of which at least a portion of the substrate is treated with the composition of claim 5.

26. The article of claim 25 further comprising a primer layer.

27. The article of claim 25 further comprising a topcoat layer.

28. An article comprising a glass substrate of which at least a portion of the substrate is treated with the composition of claim 6.

29. The article of claim 28 further comprising a primer layer.

30. The article of claim 28 further comprising a topcoat layer.

31. An article comprising a glass substrate of which at least a portion of the substrate is treated with the composition of claim 7.

32. The article of claim 31 further comprising a primer layer.

33. The article of claim 31 further comprising a topcoat layer.

34. An article comprising a glass substrate of which at least a portion of the substrate is treated with the composition of claim 8.

35. The article of claim 34 further comprising a primer layer.

36. The article of claim 34 further comprising a topcoat layer.

37. A method of making a hydrophobic surface comprising applying the water repellant composition of claim 1 to the surface of a substrate.

38. The method of claim 37 wherein applying the water repellant composition comprises using a sponge or the like.

39. The method of claim 37 wherein applying the water repellant composition comprises spraying the surface with the composition and then spreading the composition with a sponge or a cloth.

40. The method of claim 37 wherein the amount of silicone resin in the range of from about 0.1 to about 5 wt. %.

41. The method of claim 37 wherein the surface is glass, silica, alumina, or surfaces with a high oxygen content.

42. The method of claim 37 wherein the surface is an aircraft windshield.

43. The method of claim 37 wherein the curing agent is a $C_{16}$-$C_{18}$ alkoxysilane.

44. The method of claim 37 wherein the silicone resin has a cubic structure.

45. The method of claim 37 wherein the silicone resin is an MQ resin.

46. The method of claim 37 wherein the silicone resin has a molecular weight in the range of about 5,000 to about 15,000.

47. The method of claim 37 wherein the water repellant composition further comprises a solvent.

48. The method of claim 37 wherein the water repellant composition further comprises a catalyst.

49. The method of claim 37 wherein the water repellant composition further comprises one or more additives.

50. The composition of claim 37 wherein the water repellant composition further comprises a solvent, a catalyst and one or more additives.

51. The method of claim 37 wherein the water repellant composition further comprises crosslinking the curing agent.

* * * * *